(12) United States Patent
Error (10) Patent No.: US 8,825,849 B2
(45) Date of Patent: *Sep. 2, 2014

(54) DISTRIBUTED DATA COLLECTION AND AGGREGATION

(75) Inventor: Brett Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,228

(22) Filed: Mar. 23, 2012

(65) Prior Publication Data

US 2012/0185588 A1 Jul. 19, 2012

Related U.S. Application Data

(63) Continuation of application No. 10/356,685, filed on Jan. 30, 2003, now Pat. No. 8,156,216.

(60) Provisional application No. 60/353,872, filed on Jan. 30, 2002.

(51) Int. Cl.
*G06F 15/173* (2006.01)

(52) U.S. Cl.
USPC .......................................... 709/224; 709/223

(58) Field of Classification Search
USPC ................................................. 709/223, 224
See application file for complete search history.

(56) References Cited

U.S. PATENT DOCUMENTS

| | | | |
|---|---|---|---|
| 5,796,952 A | 8/1998 | Davis et al. | |
| 5,892,917 A | 4/1999 | Myerson | |
| 5,946,681 A | 8/1999 | Shorter | |
| 5,991,773 A | 11/1999 | Tagawa | |
| 6,018,619 A | 1/2000 | Allard et al. | |
| 6,076,108 A | 6/2000 | Courts et al. | |
| 6,112,238 A | 8/2000 | Boyd et al. | |
| 6,112,240 A | 8/2000 | Pogue et al. | |
| 6,138,121 A | 10/2000 | Costa et al. | |
| 6,327,609 B1 | 12/2001 | Ludewig et al. | |
| 6,385,642 B1 | 5/2002 | Chlan et al. | |
| 6,584,504 B1 | 6/2003 | Choe | |
| 6,751,663 B1* | 6/2004 | Farrell et al. | 709/224 |
| 6,766,370 B2* | 7/2004 | Glommen et al. | 709/224 |
| 6,792,458 B1 | 9/2004 | Muret et al. | |
| 6,802,447 B2 | 10/2004 | Horng | |
| 6,804,701 B2 | 10/2004 | Muret et al. | |
| 6,839,680 B1 | 1/2005 | Liu et al. | |
| 6,862,620 B2 | 3/2005 | Ullmann et al. | |
| 6,915,482 B2 | 7/2005 | Jellum et al. | |
| 6,944,660 B2 | 9/2005 | Eshghi et al. | |
| 6,973,492 B2 | 12/2005 | Streble | |
| 6,981,017 B1 | 12/2005 | Kasriel et al. | |
| 7,003,565 B2 | 2/2006 | Hind et al. | |
| 7,016,892 B1 | 3/2006 | Kokkonen et al. | |
| 7,024,472 B1* | 4/2006 | Datta et al. | 709/223 |
| 7,085,682 B1 | 8/2006 | Heller et al. | |
| 7,107,535 B2 | 9/2006 | Cohen et al. | |

(Continued)

*Primary Examiner* — Glenford Madamba (74) *Attorney, Agent, or Firm* — Kilpatrick Townsend & Stockton LLP (57) ABSTRACT

A distributed, redundant, multi-homed system collects and aggregates website usage information. Two or more data collection nodes, preferably situated in diverse locations, efficiently collect and time-stamp information from users in a wide variety of geographic locations. Data collected by the individual data collection nodes is aggregated at a master processing center, sorted according to time stamps, and subjected to statistical analysis in order to generate complete and accurate reports regarding website traffic.

16 Claims, 5 Drawing Sheets

(56) References Cited

U.S. PATENT DOCUMENTS

| | | |
|---|---|---|
| 7,146,416 B1 | 12/2006 | Yoo et al. |
| 7,185,085 B2 | 2/2007 | Bean |
| 7,216,149 B1 | 5/2007 | Briscoe et al. |
| 7,225,407 B2 | 5/2007 | Sommerer et al. |
| 7,376,722 B1 | 5/2008 | Sim et al. |
| 2002/0042750 A1 | 4/2002 | Morrison |
| 2002/0087679 A1 | 7/2002 | Pulley et al. |
| 2002/0147772 A1 | 10/2002 | Glommen et al. |
| 2002/0147805 A1 | 10/2002 | Leshem et al. |
| 2002/0184363 A1 | 12/2002 | Viavant et al. |
| 2002/0198939 A1 | 12/2002 | Lee et al. |
| 2003/0005134 A1 | 1/2003 | Martin et al. |
| 2003/0051031 A1* | 3/2003 | Streble .......... 709/224 |
| 2003/0101415 A1 | 5/2003 | Chang |
| 2003/0115333 A1 | 6/2003 | Cohen et al. |
| 2003/0128231 A1 | 7/2003 | Kasriel et al. |
| 2003/0128233 A1 | 7/2003 | Kasriel |
| 2003/0131097 A1 | 7/2003 | Kasriel et al. |
| 2003/0131106 A1 | 7/2003 | Kasriel |
| 2006/0245371 A1* | 11/2006 | Joiner et al. .......... 370/252 |

\* cited by examiner

DISTRIBUTED DATA COLLECTION AND AGGREGATION

CROSS-REFERENCE TO RELATED APPLICATIONS

The present application is a continuation of U.S. patent application Ser. No. 10/356,685 titled "Distributed Data Collection and Aggregation," filed Jan. 30, 2003, now U.S. Pat. No. 8,156,216 which claims priority from U.S. Provisional Patent Application Ser. No. 60/353,872 titled "Global Data Funneling," filed Jan. 30, 2002, both of which are incorporated by reference herein in their entirety.

BACKGROUND OF THE INVENTION

1. Field of the Invention

The present invention relates generally to website traffic data collection, and more specifically to improved techniques for collecting traffic data from multiple sources and aggregating the collected data.

2. Description of the Related Art

Website providers often wish to collect data that describes usage and visitation patterns for their websites and for individual web pages within the sites. Such information can be extremely valuable in developing usage statistics for various purposes, including for example estimating server load, determining advertising rates, identifying areas of websites that are in need of redesign, and the like.

Several companies provide third-party traffic statistics services. A content provider can sign up with such a company to obtain traffic statistics without having to install usage-tracking software at their own servers. The content provider includes, in their web pages, scripts that cause users' browsers to communicate with the third-party services so that web activity can be tracked. The third-party services operate servers that detect individual user "hits" and thereby estimate traffic at the content provider's web pages.

One commonly used technique for third-party collection of usage data is to include, in each web page to be tracked, a small image, such as a single-pixel image that is not intended to be noticed by the user. Normally, images in web pages are served from the content provider's server, along with other content. The single-pixel image, however, which is specifically included in web pages for tracking purposes and normally does not contain any meaningful content, is served from a tracking server operated by the third-party traffic statistics service. In most cases, the single-pixel image is transparent, so as to be as unobtrusive as possible.

When a user navigates to a web page, the web page's HTML code causes the user's browser to send a request for the single-pixel image. The tracking server receives the request and logs the request as a user visit to the web page. It is known in the art to embed identifier codes within the image requests, so that the tracking server can detect individual users and discern additional identifying information about each user.

Figure 1:
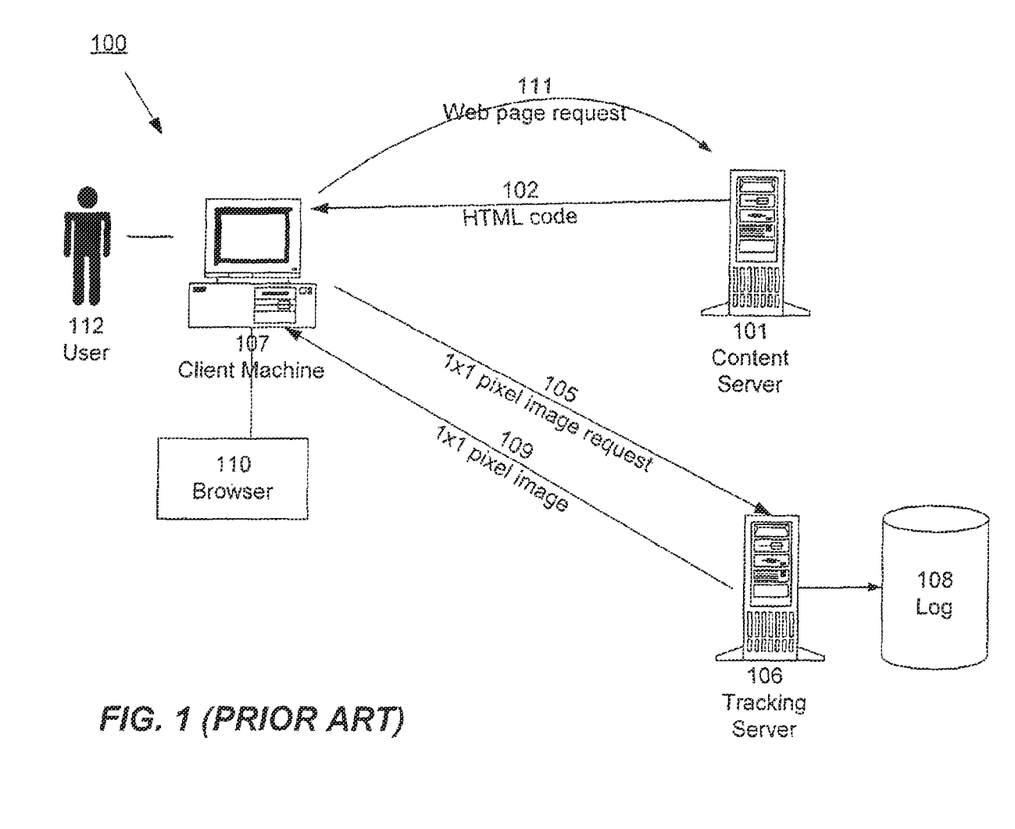
FIG. 1 is a block diagram depicting a system for website traffic data collection according to the prior art.

Referring now to FIG. 1, there is shown an example of a system 100 for website traffic data collection according to the prior art. User 112 interacts with client machine 107, which runs a software application such as browser 110 for accessing web pages. In response to a user 112 command, client machine 107 issues a web page request 111 that is transmitted via the Internet to content server 101. In response to request 111, content server 101 transmits HTML code 102 to client machine 107. Browser 110 interprets received HTML code 102 to display the requested web page on client machine 107.

As is well known in the art, HTML code 102 typically includes tags and pointers that specify additional content items to be included in the displayed web page. For example, HTML code 102 may include a pointer to an image, sound, applet, or other content item. For each of these auxiliary content items, browser 110 automatically sends a request to the server specified by the pointer. For many content items, the specified server may be content server 101.

As discussed above, HTML code 102 also includes a pointer to a transparent one-pixel image, or other unobtrusive element, that is used for traffic data collection purposes. The pointer may reference tracking server 106, which is typically a separate server operated by the third-party website traffic statistic service. In response to the pointer embedded in HTML code 102, client machine 107 issues a request 105 for the one-pixel image to tracking server 106. Tracking server 106 records the request in a log 108, and records additional information associated with the request (such as the date and time, and possibly some identifying information that may be encoded in request 105, or may be encoded in a cookie that accompanies or forms a part of request 105). Thus, tracking server 106 records the occurrence of a "hit" to the web page. Tracking server 106 also transmits the requests one-pixel image 109 to client machine 107 so that the request 105 is satisfied.

Similar techniques can be used for tracking responses to e-mail messages. An e-mail message sender can include single-pixel images in HTML e-mail messages, and can insert unique parameters or other identifying codes in the image path. Typically, the path points to a tracking server. Upon receipt of such an e-mail message, the user's e-mail client sends a request for the single-pixel image to the tracking server, which notes the unique identifying code (if any) and tracks the user's receipt of the e-mail message. Identifying codes can be cross-referenced to e-mail addresses, in order to verify receipt and/or response to an e-mail message by a user having a specific e-mail address.

In both web browsing and e-mail message applications, the tracking server can process the data stream generated by the loading of these one-pixel images in order to provide detailed usage statistics about web pages or e-mail messages. Various types of analysis techniques can be applied to these usage statistics so as to provide added value to content providers. Cookies can be stored on user machines so that repeat visitors can be identified as such.

Existing usage tracking techniques suffer from limitations, however. In particular, the unpredictable nature of Internet connectivity and availability has been the source of many problems when collecting usage data. If, for example, a portion of the Internet fails, or if for some other reason the image request does not reach the tracking server, the user's website visit may not be properly recorded. In addition, the delivery of the web page to the user may be delayed due to the failure of the tracking server to promptly transmit the single-pixel image to the user's browser. In some cases, such failure may even result in an error message after a time-out period where the browser does not receive the content. Such limitations and failures result from the use of a centralized tracking server to which all tracking image requests are sent.

What is needed, then, is a distributed usage tracking technique that allows for the use of multiple tracking servers. What is further needed is a usage tracking technique that provides appropriate redundancy so as to improve reliability of tracking data. What is further needed is a technique for aggregating usage tracking data from multiple tracking servers so as to provide an accurate representation of total traffic at a website.

SUMMARY OF THE INVENTION

The present invention provides a distributed, redundant, multi-homed system for collecting and then aggregating website usage information. The invention uses two or more time-synchronized tracking servers (referred to herein as data collection nodes, or DCNs), preferably situated in diverse locations so that they can efficiently collect information from users in a wide variety of geographic locations. Data collected by the individual DCNs is aggregated at a master processing center, or MPC, in order to generate complete and accurate statistics regarding website traffic.

In one embodiment, the invention employs single-pixel image elements, or any other web-transmittable elements, to track website usage. Requests for single-pixel image elements are distributed among the DCNs according to conventional load balancing techniques. The invention can use intelligent routing algorithms to determine which DCN is best suited to receive a particular image request. This decision may be made, for example, based on an estimate of latency time for each of a number of servers, and/ or geographic proximity, and/or current server load. In alternative embodiments, other factors may be taken into account. Randomization components may also be employed. In one embodiment, if a first DCN fails to respond within a predetermined period of time, or if there is some other problem with a particular DCN, the request is routed to an alternative DCN. Because network conditions are variable, a given web browser may report data to different DCNs at different times, even within the same session in some situations.

The use of multiple, diversely located DCNs facilitates improved reliability in data collection and minimizes data loss. As long as a user's web browser can access at least one of the DCNs, the user's web activity can be successfully captured.

Once the data has been collected at various DCNs, it is reassembled to form a representation of the complete data stream describing website traffic. In one embodiment, the DCNs periodically compress and/or encrypt and transmit their data to an MPC. Data transfer may be initiated by either the DCN or the MPC. The MPC is a designated hub at which data is consolidated and aggregated. A given system can include any number of MPCs. In one embodiment in which the system can handle several data streams simultaneously, each DCN may be designated an MPC for one or more data streams. In one embodiment, a given data stream is assigned to one, and only one, MPC.

The MPC decompresses and/or decrypts the data. If the MPC is responsible for more than one data stream, it sorts or divides the data according to data stream. Then, each data item is sorted chronologically, according to the attached time stamp. The MPC thereby reconstructs each original data stream as if a single data collection node had received it. The result can then be passed on to a processing module for statistical analysis.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Figure 2:
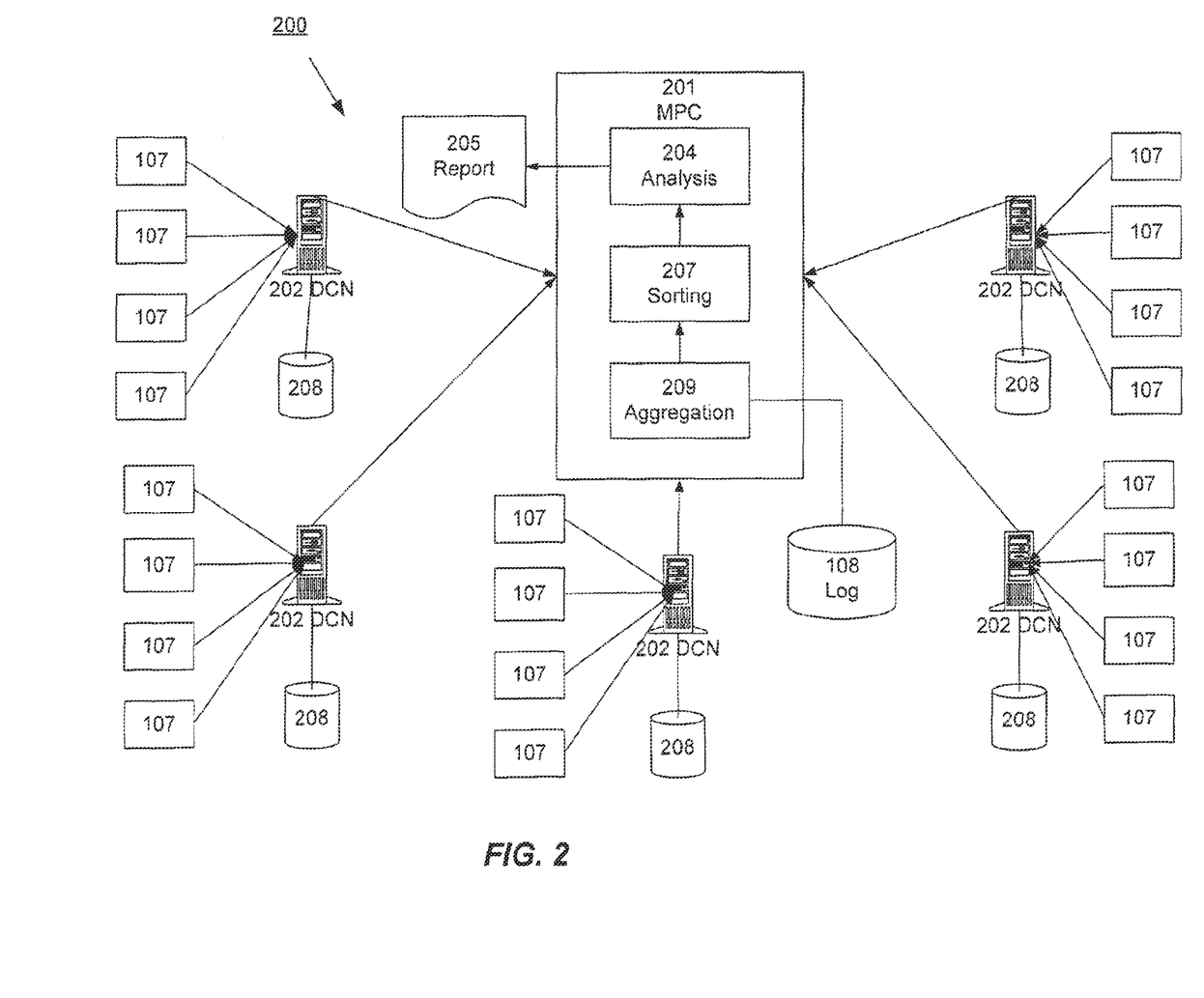
FIG. 2 is a block diagram depicting a system for distributed data collection and aggregation according to one embodiment of the present invention.

Referring to FIG. 2, there is shown a system 200 for distributed data collection and aggregation according to one embodiment of the present invention. Two or more diversely located data collection nodes (DCNs) 202 are deployed. In the example of FIG. 2, five DCNs 202 are depicted; however, one skilled in the art will recognize that any number of DCNs 202 could be used. In one embodiment, each DCN 202 is implemented as a server or group of servers that is capable of responding to client 107 requests for single-pixel image results, and is further capable of recording, in a storage device 208, log entries for such client requests. In one embodiment, DCNs 202 include clocks that are synchronized with one another.

In the example of FIG. 2, each DCN 202 receives requests from a group of client machines 107. However, in one embodiment, the group of client machines 107 corresponding to a given DCN 202 is not predefined. Rather, a client machine 107 is assigned to a DCN 202 dynamically, according to current network conditions and other factors. Thus, a particular client machine 107 may communicate with a first DCN 202 at one point in time, and a second DCN 202 at another point in time, even during the same session in some circumstances. Factors affecting the selection of a particular DCN 202 may include, for example, estimated latency, bandwidth, geographic proximity, server load, and the like.

In one embodiment, client requests for single-pixel images are distributed among DCNs 202 using conventional load balancing techniques. Intelligent routing techniques may be used to estimate which DCN 202 is able to respond with the shortest network latency time. In alternative embodiments, a DCN 202 may be chosen at random or according to a rotating selection scheme. In yet other embodiments, some combination of known load balancing techniques, with or without random or sequential elements, is used. Because network conditions are variable, a given web browser may report data to different DCNs 202 at different times, even within the same session in some situations. In an alternative embodiment, once a web browser has begun communicating with a particular DCN 202, it reports further data to the same DCN 202 for the remainder of the current session. For future sessions, however, another DCN 202 may be chosen.

In some embodiments, if a DCN 202 does not respond to a request in a timely manner, the request is forwarded to a secondary DCN 202. Thus, for a particular request, various DCNs 202 may be designated as primary, secondary, tertiary, and the like.

Figure 3:
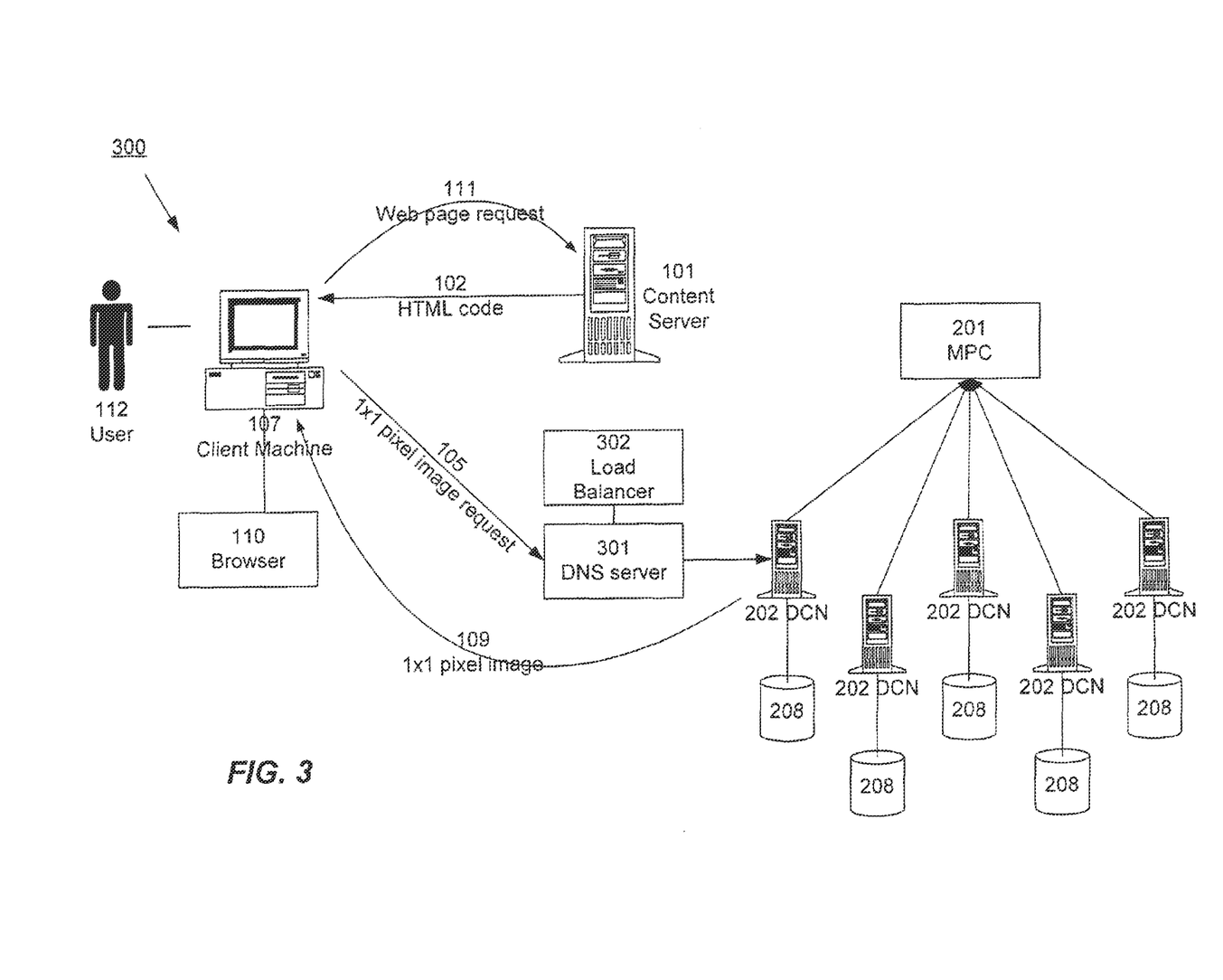
FIG. 3 is a block diagram depicting a system for routing website traffic data to one of a number of data collection nodes, according to one embodiment of the present invention.

Referring also to FIG. 3, there is shown one example of a system 300 for routing website traffic data to a selected one of the DCNs 202 by using one or more local domain name system (DNS) servers 301. User 112 interacts with client machine 107, which runs browser 110 for accessing web pages. In response to a user 112 command, client machine 107 issues a web page request 111 that is transmitted via the Internet to content server 101. In response to request 111, content server 101 transmits HTML code 102 to client machine 107. Browser 110 interprets received HTML code 102 to display the requested web page on client machine 107.

As discussed above, HTML code 102 includes a pointer to an element, such as a transparent single-pixel image, that is used for traffic data collection purposes. For illustrative purposes, the invention is described herein with reference to a single-pixel image, although one skilled in the art will recognize that other types of elements or resources may be used.

In response to the pointer embedded in HTML code 102, client machine 107 issues a request 105 for the one-pixel image. In one embodiment, the pointer to the single-pixel image is provided as a uniform resource locator (URL) including a domain name. As is known in the art, such URLs are typically resolved to IP addresses by the use of a DNS server. In the example of FIG. 3, DNS server 301 routes the single-pixel image request 105 to one of DCNs 202 by returning the IP address of the selected DCN 202. Thus, DNS server 301 controls the distribution of request 105 among DCNs 202.

In one embodiment, DNS server 301 uses load balancer 302 to select one of the available DCNs 202 according to conventional load balancing techniques. For example, the invention may use a load balancer such as the Alteon Content Director, available from Nortel Networks Corporation of Brampton, Ontario, Canada. Selection of a DCN 202 may take into account, for example, current network conditions and load factors, geographical proximity, and the like.

In another embodiment, a number of DNS servers 301 are provided, each located proximate to one or more DCNs 202. Image request 105 is transmitted to several DNS servers 301 simultaneously. In general, some or all of the DNS server 301 will respond with IP addresses of DCNs 202, but because of network conditions, relative proximity, and other factors, some of these responses will be received at machine 107 more quickly than others. Client machine 107 considers the first received reply to be authoritative, since the DCN 202 located proximate to the first-replying DNS server 301 is likely to have the best response time. Accordingly, image request 105 is transmitted to DCN 202 having the IP address identified by the first response received from one of the DNS server 301. In one embodiment, subsequent DNS server 301 responses are ignored. In other embodiments, the IP addresses included in the subsequent DNS server 301 responses are used as secondary IP addresses, in case the primary DCN 202 does not reply within a specified period of time.

In an alternative embodiment, the group of client machines 107 corresponding to each DCN 202 is predefined. For example, all client machines 107 in a particular geographic area, or belonging to a defined set of Internet Protocol (IP) addresses, might be assigned to a single DCN 202.

Upon receipt of request 105, DCN 202 records the request in local log storage 208, and records additional information associated with the request (such as the date and time, and possibly some identifying information that may be encoded in request 105, or may be encoded in a cookie that accompanies or forms a part of request 105). Thus, DCN 202 records the occurrence of a "hit" to the web page. DCN 202 also transmits the requests one-pixel image 109 to client machine 107 so that request 105 is satisfied.

Periodically, each DCN 202 transmits its collected log data, as stored in local log storage 208, to master processing center (MPC) 201. In one embodiment, MPC 201 is implemented as a server or as a cluster of servers. In one embodiment, DCN 202 compresses and/or encrypts the data before transmitting it, so as to conserve bandwidth and improve efficiency of transmission. Once MPC 201 acknowledges successful receipt of the log data, DCN 202 deletes the transmitted data from local log storage 208. A given system can include any number of MPCs 201. In one embodiment in which the system can handle several data streams simultaneously, each DCN 202 may be designated an MPC 201 for one or more data streams. In one embodiment, a given data stream is assigned to one, and only one, MPC 201.

In one embodiment, each DCN 202 transmits its collected log data at regular intervals, such as for example every minute, or every few minutes. In another embodiment, each DCN 202 transmits its collected log data when a certain amount of data has been collected. In yet another embodiment, MPC 201 initiates the data transfer by making a request to each DCN 202; DCN 202 then transmits its collected log data in response to the request from MPC 201.

Figure 4:
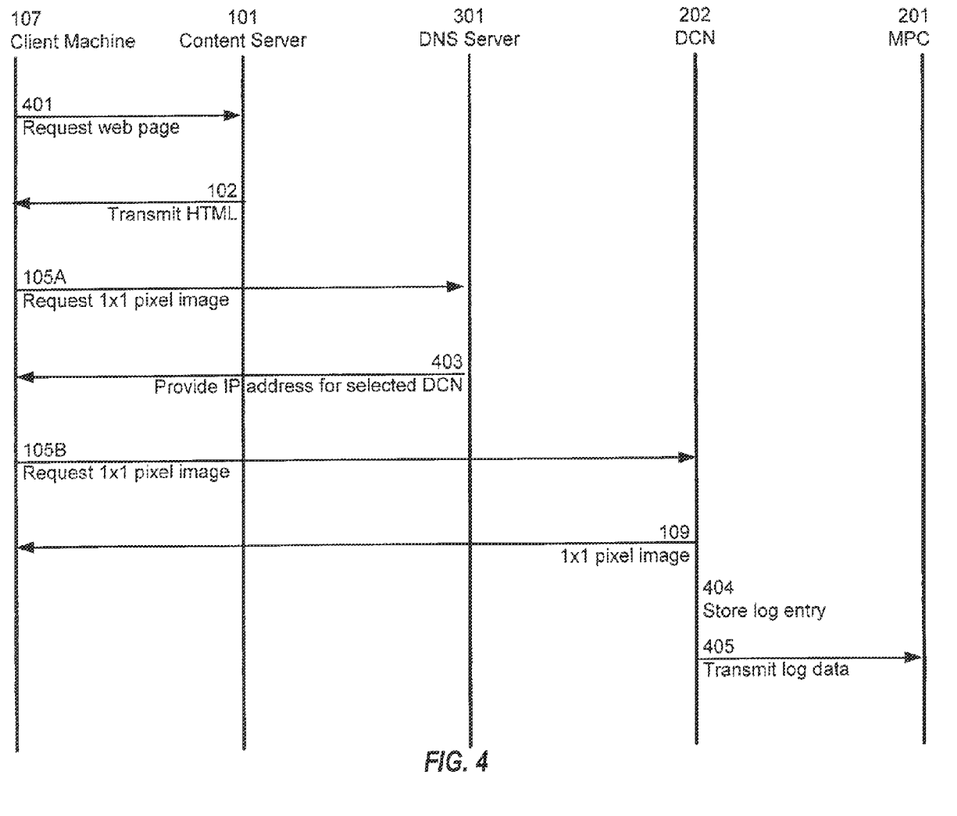
FIG. 4 is an event trace diagram depicting a method of distributed data collection and aggregation according to one embodiment of the present invention.

Referring now to FIG. 4, there is shown an event trace diagram depicting a method for distributed data collection according to the present invention. The event trace diagram is an example of one method that can be implemented in an architecture similar to that depicted in FIGS. 2 and/or 3.

Client machine 107, running browser 110, requests 401 a web page from content server 101. Content server 101 transmits 102 the HTML code for the requested web page, including code that causes browser 110 to request a single-pixel image (or other resource or file) from a location indicated by a URL. In the example of FIG. 4, client machine's 107 request 105 for the single-pixel image is broken down into two substeps. First, client machine 107 transmits a request 105A to DNS server 301 to resolve the specified URL. DNS server 301 responses by providing 403 an IP address for one of the DCNs 202, representing a selection that may be made according to conventional load balancing techniques, or by other methods. Client machine 107 then transmits a request 105B for the single-pixel image to DCN 202 specified by the IP address. DCN 202 responds to request 105B by transmitting single-pixel image 109 back to client machine 107. DCN 202 also stores 404 a log entry in local log storage 208, to record the request, including particulars such as time, date, requesting IP address, and the like. Periodically, as described above, DCN 202 transmits 405 collected log data to MPC 201. In one embodiment, DCN 202 compresses and/or encrypts the collected log data before transmitting it.

In alternative embodiments, when DNS server 301 receives request 105A, it routes the request to the appropriate DCN 202, so that client machine 107 is not required to send request 105B. The selected DCN 202 then transmits 109 the single-pixel image directly to client machine 107, as described above.

Once MPC 201 has received log data from one or more DCNs 202, it aggregates and processes the received data. In this manner, all data for a particular data stream is reassembled so that it can be analyzed in the same manner as though it were collected from a single collection node. MPC 201 reassembles data pertaining to each user session, even if the log data for individual events within the session was collected at different DCNs 202. MPC 201 also aggregates data pertaining to a group of users, so that statistical analysis can be applied to the collected data. In an alternative embodiment, MPC 201 reassembles the data but does not perform any further aggregation or statistical analysis on the reassembled data.

Figure 5:
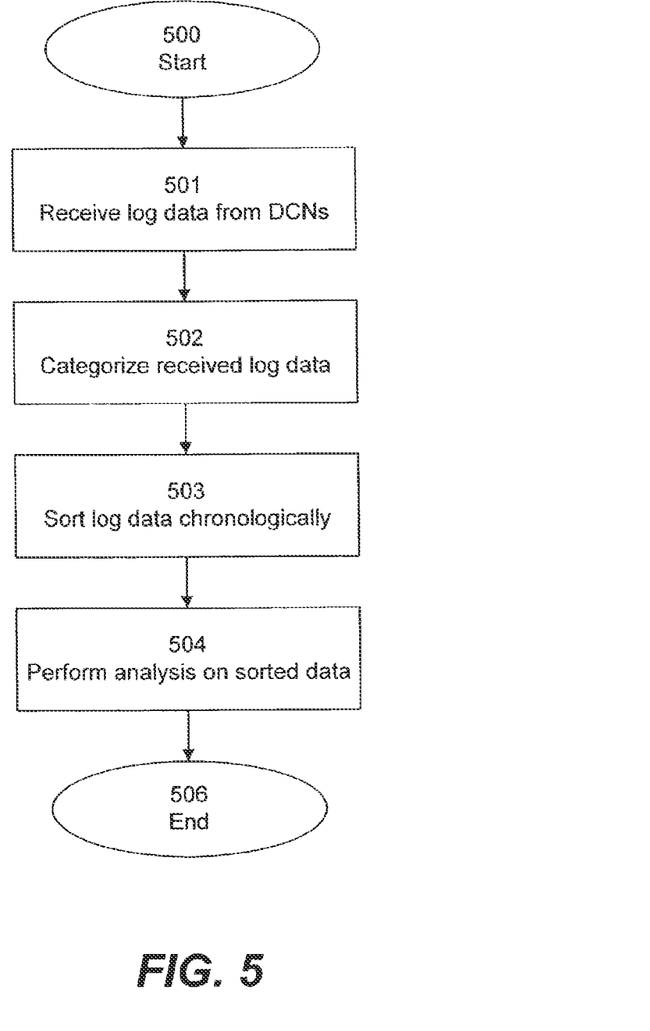
FIG. 5 is flow diagram depicting an aggregation method according to one embodiment of the present invention.

Referring now to FIG. 5, there is shown a flowchart of a method for aggregating and processing received data at an MPC 201. MPC 201 receives 501 log data from one or more DCNs 202. If the received log data is compressed and/or encrypted, MPC 201 decompresses and/ or decrypts it. In one embodiment, MPC 201 performs steps 502 through 504 every time it receives 501 log data; in an alternative embodiment, MPC 201 performs steps 502 through 504 periodically or after a predefined quantity of log data has been received.

In one embodiment, before proceeding, MPC 201 determines how up-to-date its collected data is. For example, each DCN 202 may transmit to MPC 201 a "current up to" time stamp which indicates that all data previous to the indicated time has been transmitted by the given DCN 202. DCN 202 can transmit the time stamp in-line with the collected data, or it may transmit the time stamp in response to a specific request from MPC 201. If DCN 202 does not provide a "current up to" time stamp, in one embodiment MPC 201 assumes that DCN 202 is transmitting the data in the order it was received; thus, MPC 201 assumes that the "current up to" time stamp is equal to the time stamps on the individual data packets received.

In general, if MPC 201 has collected all relevant log data up to a specified time, it considers that specified time to be the indication of how current the overall collection of data is. If additional log data later than the specified time has been collected from some DCNs 202 but not from others, the additional log data is considered incomplete. MPC 201 does not perform aggregation on the incomplete log data, but rather waits for the remaining DCNs to provide the missing log data. In one embodiment, MPC 201 may transmit one or more requests to DCNs 202 when log data is missing, incomplete, or corrupted. In one embodiment, MPC 201 waits all data for a time period has been collected from all DCNs 202 before performing aggregation for the time period.

If transmission between the DCN 202 and MPC 201 is interrupted or fails, DCN 202 retains the data locally until it can be successfully transmitted to MPC 201. In one embodiment, MPC 201 transmits an acknowledgment to DCN 202 when data is successfully received; upon receipt of the acknowledgment, in one embodiment DCN 202 purges the data from local storage 208.

In one embodiment, if one or more DCNs 202 is unable to provide needed data, MPC 201 may proceed without the data, but may flag the aggregated data as incomplete. Alternatively, MPC 201 may await a "reset" command from a system operator, before proceeding with additional data aggregation. Alternatively, MPC 201 or an automated controller may automatically perform such a reset after some predefined period of time, or after a predefined number of unanswered requests for missing data, or after DCN 202 indicates that the requested data is unavailable. One skilled in the art will recognize that other techniques exist for handling exceptional situations such as erroneous, corrupted, or missing data.

If applicable, MPC 201 categorizes 502 the received log data according to some criterion, such as by topic or by user. For example, MPC 201 may divide the received data so that each user's individual data is treated separately; alternatively, data for a group of users may be considered collectively.

MPC 201 sorts 503 the received log data according to date and time stamps, so as to generate a single set of log events for each category (as divided in step 502). In one embodiment, as described above, the clocks of all DCNs 202 are synchronized with one another, so that sorting 503 yields an accurate set of log events. MPC 201 then performs 504 statistical analyses on the sorted data, according to well known techniques for analyzing website traffic and usage. In another embodiment, MPC 201 transmits the sorted data to a data processor module (not shown) for statistical analysis according to known techniques. In yet another embodiment, MPC 201 does not perform any statistical analysis on the sorted data, but merely stores or transmits the sorted data as needed.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A distributed data collection system, comprising:
    a plurality of data collection nodes comprising a first collection node and a second collection node, wherein the first collection node is configured for collecting first tracking data indicative of at least one client machine accessing a web site during a first time period and the second collection node is configured for collecting second tracking data indicative of the at least one client machine accessing the web site during a second time period, wherein the first tracking data comprises a first request for a single pixel image and the second tracking data comprises a second request for the single pixel image;
    a domain name server configured for receiving the first and second requests from the at least one client machine and resolving the first and second requests to respective first and second network addresses for the first and second collection nodes, wherein the domain name server comprises a processor that is configured for:
        routing the first tracking data to the first collection node based on the first collection node being more responsive to the at least one client machine than the second collection node during the first time period, and
        routing the second tracking data to the second collection node based on the second collection node being more responsive to the at least one client machine than the first collection node during the second time period;
    a master processing center configured for receiving collected data from the first and second collection nodes and for aggregating the received data into the website usage data describing the at least one client machine' access to the web site.

2. The distributed data collection system of claim 1, wherein each data of the first and second collection nodes is configured for collecting the respective first and second tracking data via the Internet and transmits the collected data to the master processing center via the Internet.

3. The distributed data collection system of claim 1, wherein the first and second traffic data comprises website usage data for the website, wherein the website is hosted by a content server separate from the plurality of connection nodes and the master processing center.

4. The distributed data collection system of claim 1, wherein each of the first and second collection nodes is configured for locally storing the collected first and second tracking data.

5. The distributed data collection system of claim 1, wherein each of the collected first and second tracking data comprises a respective time stamp associated with a respective client request received from the at least one client machine for the single-pixel image included in a page of the web site.

6. The distributed data collection system of claim 5, wherein the master processing center is further configured for sorting the received data according to the time stamps.

7. The distributed data collection system of claim 5, wherein the collected first and second tracking data collectively represents a plurality of data streams, and wherein the master processing center is further configured for sorting the collected first and second tracking data received from the first and second collection nodes according to data streams and according to time stamps.

8. A method for distributed collection of website traffic data, the method comprising:
    collecting, by a first collection node of a distributed data collection system, first tracking data indicative of at least one client machine accessing a web site during a first time period, wherein the first tracking data comprises a first request for a single pixel image;
    collecting, by a second collection node of the distributed data collection system, second tracking data indicative of the at least one client machine accessing the web site during a second time period, wherein the second tracking data comprises a second request for the single pixel image;
    receiving, by a domain name server, the first and second requests from the at least one client machine;
    resolving, by the domain name server, the first and second requests to respective first and second network addresses for the first and second collection nodes, wherein the domain name server, wherein the domain name server causes the first tracking data to be routed to the first collection node based on the first collection node being more responsive than the second collection node during the first time period and the domain name server causes the second tracking data to be routed to the second collection node based on the second collection node being more responsive than the first collection node during the second time period;
    receiving, by a master processing center of the distributed data collection system, the collected first and second tracking data from the first and second tracking data collection nodes; and
    aggregating, by the master processing center, the received data into website usage data describing the at least one client machine's access to the web site.

9. The method of claim 8, wherein the domain name server resolves the first request to the first collection node based on the first collection node being more responsive during the first time period and resolves the second request to the second collection node based on the second collection node being more responsive during the second time period.

10. The method of claim 8, wherein the first or second collection node being more responsive is determined based on at least one of network latency times for the respective first and second collection nodes, respective first and second available network bandwidths for communicating with the respective first and second collection nodes, and respective first and second server loads for the respective first and second collection nodes.

11. The method of claim 8, wherein the first or second collection node being more responsive is determined based on one of the first or second collection node responding to a request during a predetermined time period and another of the first or second collection node failing to respond to the request during the predetermined time period.

12. The method of claim 8, wherein the first and second time periods respectively comprise first and second sessions established by the at least one client machine with a content server for accessing the web site.

13. The method of claim 8, wherein the first and second time periods respectively comprise first and second portions of a session established by the at least one client machine with a content server for accessing the web site.

14. A non-transitory computer-readable storage medium storing program instructions that when executed by a computer perform operations comprising:
   collecting, by a first collection node of a distributed data collection system, first tracking data indicative of at least one client machine accessing a web site during a first time period, wherein the first tracking data comprises a first request for a single pixel image;
   collecting, by a second collection node of the distributed data collection system, second tracking data indicative of the at least one client machine accessing the web site during a second time period, wherein the second tracking data comprises a second request for the single pixel image;
   receiving, by a domain name server, the first and second requests from the at least one client machine;
   resolving, by the domain name server, the first and second requests to respective first and second network addresses for the first and second collection nodes, wherein the domain name server causes the first tracking data to be routed to the first collection node based on the first collection node being more responsive than the second collection node during the first time period and the domain name server causes the second tracking data to be routed to the second collection node based on the second collection node being more responsive than the first collection node during the second time period;
   receiving, by master processing center of the distributed data collection system, the collected first and second tracking data from the first and second tracking data collection nodes; and
   aggregating, by the master processing center, the received data into website usage data describing the at least one client machine's access to the web site.

15. The non-transitory computer-readable storage medium of claim 14, wherein the first or second collection node being more responsive is determined based on at least one of network latency times for the respective first and second collection nodes, respective first and second available network bandwidths for communicating with the respective first and second collection nodes, and respective first and second server loads for the respective first and second collection nodes.

16. The non-transitory computer-readable storage medium of claim 14, wherein the first or second collection node being more responsive is determined based on one of the first or second collection node responding to a request during a predetermined time period and another of the first or second collection node failing to respond to the request during the predetermined time period.

* * * * *

UNITED STATES PATENT AND TRADEMARK OFFICE
CERTIFICATE OF CORRECTION

PATENT NO. : 8,825,849 B2  
APPLICATION NO. : 13/429228  
DATED : September 2, 2014  
INVENTOR(S) : Brett Error Page 1 of 1

It is certified that error appears in the above-identified patent and that said Letters Patent is hereby corrected as shown below:

In the Claims

Column 9, Claim 1, Line 57

Delete "machine'"

Insert --machine's--

Signed and Sealed this
Thirtieth Day of December, 2014

Michelle K. Lee
*Deputy Director of the United States Patent and Trademark Office*